No. 779,705. PATENTED JAN. 10, 1905.
W. T. GIBBS.
METHOD OF TREATING ALKALINE SOLUTIONS OF CHROMATE OF SODA.
APPLICATION FILED FEB. 10, 1904.
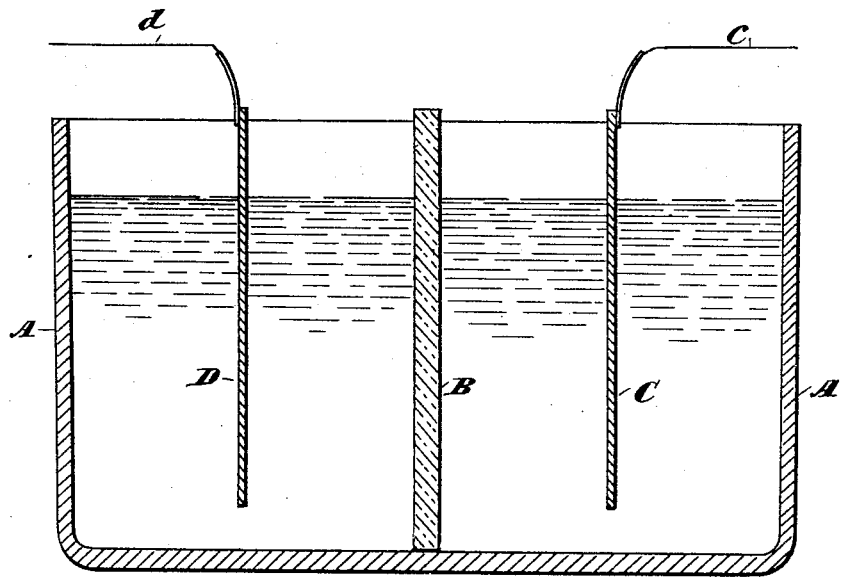

No. 779,705.

Patented January 10, 1905.

UNITED STATES PATENT OFFICE.

WILLIAM T. GIBBS, OF BUCKINGHAM, CANADA, ASSIGNOR, BY MESNE ASSIGNMENTS, TO THE NATIONAL ELECTROLYTIC COMPANY, A CORPORATION OF NEW YORK.

METHOD OF TREATING ALKALINE SOLUTIONS OF CHROMATE OF SODA.

SPECIFICATION forming part of Letters Patent No. 779,705, dated January 10, 1905.

Application filed February 10, 1904. Serial No. 192,898.

*To all whom it may concern:*

Be it known that I, WILLIAM T. GIBBS, a subject of the King of Great Britain, residing at Buckingham, Province of Quebec, county of Ottawa, Canada, have invented certain new and useful Improvements in Methods of Treating Alkaline Solutions of Chromate of Soda, described in the following specification.

This invention relates to an improved process for treating alkaline solutions of chromate of soda, the process being intended especially for use in manufacturing bichromate of soda, in which manufacture bicarbonate of soda also may be produced.

The alkaline solution of chromate of soda used in my process is naturally the leach liquor which is produced in the present methods of manufacturing bichromate of soda by the extraction of chrome-milk with water; but it will be understood that the present process is applicable to alkaline solutions of chromate of soda however produced. The present commercial method of producing such leach liquor, and that which I preferably use for this purpose, is to heat a mixture of chrome ore, lime, and carbonate of soda until practically all the chromium oxid is converted into chromic oxid, which combines with the soda to form chromate of soda. The roasted mass is removed from the furnace, cooled, and thoroughly extracted with water, the chromate of soda and the excess of carbonate of soda present going into solution and a waste residue being left which contains the lime and the impurities of the chrome ore. The fresh leach liquor will contain free alkali in the form of caustic soda, some of which will gradually be converted on exposure to the atmosphere to form carbonate of soda. The treatment of this alkaline solution of chromate of soda under my new process in its complete form for the manufacture of bichromate of soda is as follows: The solution is first treated with carbonic-acid gas, which may conveniently be done by pumping the gas through a column of the liquid, as now common in connection with the manufacture of bicarbonate of soda, so as to precipitate all the free alkali as bicarbonate of soda, which is filtered out of the solution, leaving a neutral solution of chromate of soda. This neutral solution of chromate of soda is then treated electrolytically to separate it into separate solutions containing in one case bichromate of soda and in the other chromate of soda and free alkali or caustic soda. For this purpose I may use any suitable electrolytic cell, but preferably use a cell divided by a porous diaphragm into two compartments, with an anode of platinum or other suitable material and a cathode of iron or other metal not acted upon by an alkaline liquor. The bichromate is formed on the anode side of the diaphragm and the free alkali or caustic soda on the cathode side. The cathode liquors from the cell consist of liquors similar to the leach liquor or alkaline solution of chromate of soda, above described as produced by extraction of chrome-milk with water, but with more free alkali and less chromate. This cathode liquor or solution is concentrated by evaporation to bring up the chromate in solution to such a strength that bicarbonate of soda is insoluble in the liquor and is then treated with carbonic-acid gas in the same manner as the leach liquor and all the free alkali removed as bicarbonate of soda, leaving a neutral solution of chromate of soda, which is subjected to further electrolysis in the same manner as previously described, preferably in a mixture with the leach liquor from which the free alkali has been extracted by carbonic-acid gas. The cathode liquors thus successively formed in the cell are successively treated by carbonic-acid gas and returned to the cell with the successive portions of the leach liquor. The anode liquors from the cell contain nothing but bichromate of soda, and these solutions are merely evaporated to the point at which they solidify on cooling, thus giving a cake of solid bichromate of soda.

The accompanying drawing shows in diagrammatic section an electrolytic cell suitable for carrying out my process, in which—

A is the cell divided by the porous partition B, and C D the anode and cathode, having the connecting-wires c d.

The invention includes not only the complete process above described, but also certain subordinate processes which may be used otherwise than in the complete process, all as particularly pointed out in the claims.

What I claim is—

1. The method of treating alkaline solutions of chromate of soda, which consists in removing the free alkali therefrom and then treating the solution by electrolysis to produce bichromate of soda.

2. The method of treating alkaline solutions of chromate of soda, which consists in removing the free alkali therefrom and then treating the solution by electrolysis to produce a solution of bichromate of soda and a solution containing chromate of soda and caustic soda.

3. The method of treating alkaline solutions of chromate of soda, which consists in removing the free alkali therefrom and then treating the solution by electrolysis to produce a solution of bichromate of soda and a solution containing chromate of soda and caustic soda and removing the free alkali as bicarbonate of soda from the solution containing chromate of soda and caustic soda.

4. The method of treating alkaline solutions of chromate of soda, which consists in removing the free alkali therefrom and then treating the solution by electrolysis to produce an anode solution of bichromate of soda and a cathode solution containing chromate of soda and caustic soda, removing the free alkali from the cathode solution, and then treating the cathode solution by electrolysis to produce bichromate of soda.

5. The method of treating alkaline solutions of chromate of soda, which consists in removing the free alkali therefrom and then treating the solution by electrolysis to produce a solution of bichromate of soda and a solution containing chromate of soda and caustic soda, concentrating the solution containing chromate of soda and caustic soda to such a strength that bicarbonate of soda is insoluble in the liquor, and removing the free alkali from the concentrated solution.

6. The method of treating alkaline solutions of chromate of soda, which consists in removing the free alkali therefrom and then treating the solution by electrolysis to produce a solution of bichromate of soda and a solution containing chromate of soda and caustic soda, concentrating the solution containing chromate of soda and caustic soda to such a strength that bicarbonate of soda is insoluble in the liquor, removing the free alkali from the concentrated solution, and treating the concentrated solution by electrolysis to produce bichromate of soda.

7. The method of treating alkaline solutions of chromate of soda, which consists in removing the free alkali therefrom to produce a neutral solution and then treating the neutral solution by electrolysis to produce an anode solution of bichromate of soda and a cathode solution containing chromate of soda and caustic soda, removing the free alkali from the cathode solution, then mixing the treated cathode solution with a fresh portion of the neutral solution of chromate of soda, and then treating the mixed solution by electrolysis to produce bichromate of soda, and so continuing the process with successive cathode solutions and successive portions of the alkaline solution.

8. The method of treating alkaline solutions of chromate of soda, which consists in removing the free alkali therefrom to produce a neutral solution and then treating the neutral solution by electrolysis to produce an anode solution of bichromate of soda and a cathode solution containing chromate of soda and caustic soda, concentrating the cathode solution to such a strength that bicarbonate of soda is insoluble therein, removing the free alkali from the cathode solution, then mixing the treated cathode solution with a fresh portion of the neutral solution of chromate of soda, then treating the mixed solution by electrolysis to produce bichromate of soda, and so continuing the process with successive cathode solutions and successive portions of the alkaline solution.

9. The method of treating a weak alkaline solution of chromate of soda, which consists in concentrating the solution to such a strength that bicarbonate of soda is insoluble therein, removing the free alkali as bicarbonate of soda, and then treating the solution electrolytically to produce bichromate of soda.

In testimony whereof I have hereunto set my hand in the presence of two subscribing witnesses.

WILLIAM T. GIBBS.

Witnesses:
  C. J. SAWYER,
  W. H. KENNEDY.